United States Patent [19]

Lindaberry

[11] Patent Number: 5,065,542

[45] Date of Patent: Nov. 19, 1991

[54] MULTI WEIGHTED SPRING DRIVEN LURE ATTACHMENT

[76] Inventor: Harold L. Lindaberry, P.O. Box 241, Mansfield, Pa. 16933

[21] Appl. No.: 593,793

[22] Filed: Oct. 5, 1990

[51] Int. Cl.⁵ .............................................. A01K 91/00
[52] U.S. Cl. ................................. 43/42.74; 43/44.96; 43/43.14
[58] Field of Search ................ 43/42.74, 44.96, 44.92, 43/43.14, 44.89

[56] References Cited

U.S. PATENT DOCUMENTS 2,589,715  3/1952  Lysikowski ..................... 43/43.14
2,759,290  8/1956  Strausser ........................ 43/42.74
4,044,491  8/1977  Potter ............................. 43/42.22
4,314,420  2/1982  Dickinson et al. ............. 43/42.39
4,428,144  1/1984  Dickinson ...................... 43/44.96
4,756,115  7/1988  Reyen ............................ 43/42.74

Primary Examiner—Richard K. Seidel
Assistant Examiner—Chuck Y. Mah

[57] ABSTRACT

A multi weighted spring driven lure attachment device consisting of resilient member bent in 3 sections. A lure bearing arm to which the line and hook are attached. Vertical and lower arms to which weights are attached. When used with a mechanical jigging device cause the lures to swim in a circle resembling wounded prey.

7 Claims, 2 Drawing Sheets

MULTI WEIGHTED SPRING DRIVEN LURE ATTACHMENT

BACKGROUND OF THE INVENTION

The invention relates in general to fishing lures and more particular to an improvement in fishing lure movement. It is of particular use with mechanical jigging devices where sustained rhythmic, high speed line oscillations are possible.

It is a multi weighted spring driven device which utilizes the lines oscillations to power the action which gives improved lure movement even allowing the lure to swim in circles resembling an injured prey.

Wire lure attachments are well known in the art and essentially consist of a weighted jig head with lure attached to a bent wire shaft on which various spinner blades propellers are attached as attractants. These rely on relatively rapid movement through the water for the desired effect.

Mechanical jigging devices impart more swimming type action to weighted jigs; but the currently available lures remain relatively stationary (on a horizontal plane) and the lure action is restricted because the lure is attached to the weighted hook and action thus is restricted by the fall rate of the jig in water. This restricts the speed of operation and amount of mobility of the lure that is possible.

SUMMARY OF THE INVENTION

This invention relates to utilizing both spring action and gravity to activate the lure and hook action, making circular swimming action possible when the lure is arranged at approximately right angles to the lure bearing member. The fact that the unweighted lure is on the extended lure bearing arm gives more action to the lure regardless of the lure attachment. The device described herein consists of 2 or more spaced weights mounted on a resilient bent member with the took(s) on the end opposite to the weighted end. The line attachment is located on the hook (lure bearing) arm anywhere between the hook and vertical bend, preferably close to the vertical bend. The lower weight(s) should be significantly heavier than the upper weight as this acts as a fulcrum or driving point of the device. If the weights are equal the device will operate to some degree and if the upper weight is heavier it will not operate. The upper weight is the driving force of the device and has most of the movement whereas the lower weight remains relatively stationary. The upper and lower weights may be either fixed or adjustable on their respective arms. The power of the device is developed from the spring action of the resilient member and the driving force is the upper weight(s), thus if there is no upper weight the device does not operate. Likewise if the shaft is rigid the device does not operate.

The primary purpose of the invention is to improve the lure action possible with mechanical jigging devices and enabling the user to cause the bait or lure to swim in a circle resembling injured prey. To achieve the circular swimming action the lure or bait should be mounted at approximately right angles to the lure/hook bearing member and be in a relatively horizontal plane.

The circular swimming motion requires a rhythmic rapid line movement of 100 to 500 oscillations per minute not normally obtainable by hand jigging methods, especially on a sustained basis. However, lure action is improved considerably over where the lure is directly attached to the jig head.

DESCRIPTION OF PREFERRED EMBODIMENT

Figure 1:
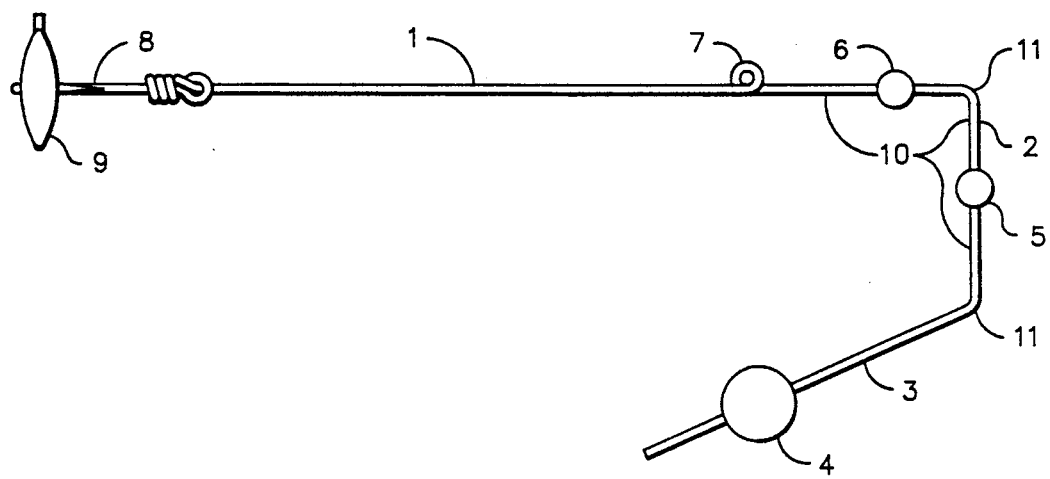
FIG. 1 is a side view of lure attachment device according to my invention.
Figure 4:
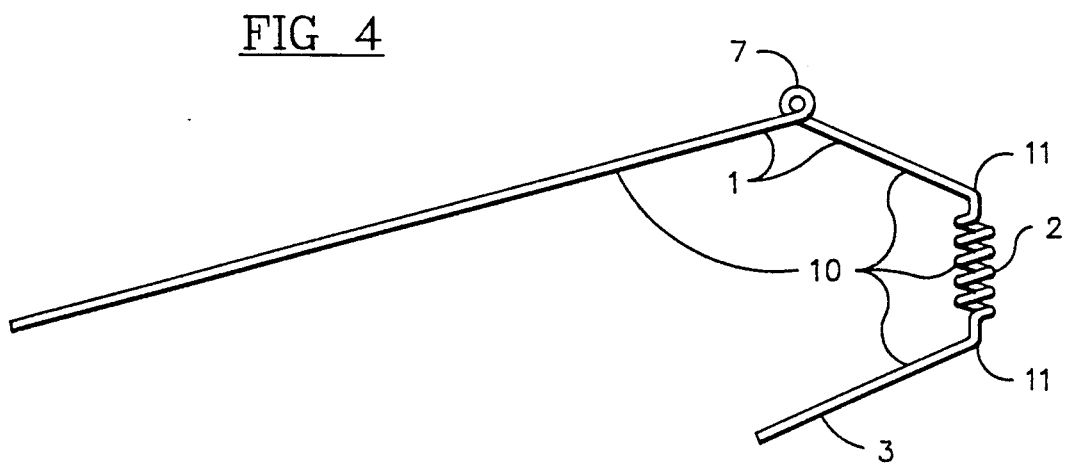
FIG. 4 is a side view of resilient shaft member.

Reference is made to the drawing FIG. 1 in which the resilient member 10 is bent into three sections a lure bearing member 1, a vertical member 2, and a lower member 3. The hooks(s) is/are attached to the lure bearing member 1. Weights 4 and 5 are attached to lower member 3 and vertical member 2 respectively. Weight 6 may optionally be attached to the lure bearing member between the line attachment 7 and the vertical member bend 11 the resilient member may have straight bends as indicated in 11 FIG. 1 or coiled bends as indicated in 11 FIG. 4. The lower weight 4 should preferably be significantly heavier than the upper weight 5. If the upper weight 5 is significantly heavier than the lower weight 4 or if it is absent the device will not operate. If the lower weight 4 and the upper weight 5 are equal the device will operate but not nearly as efficiently.

Figure 2:
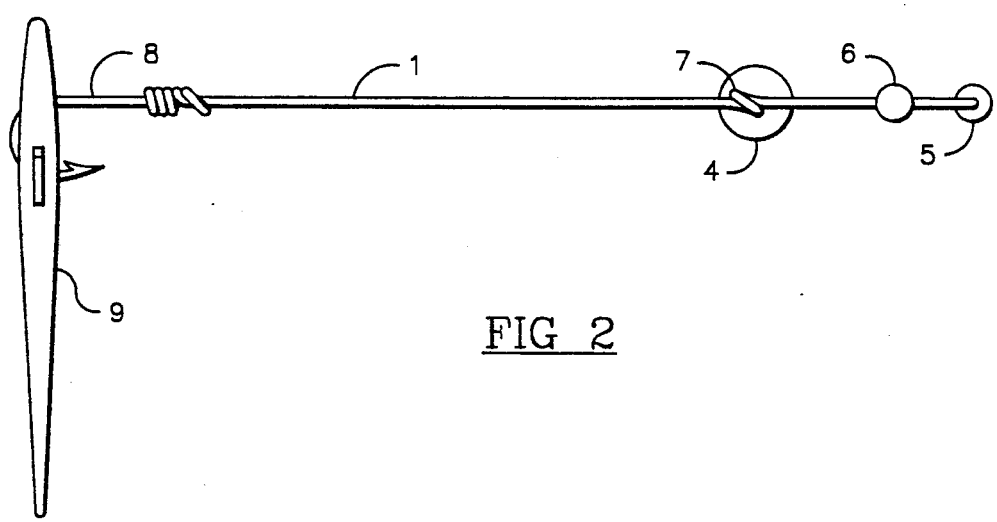
FIG. 2 is a top view of lure attachment device shown in FIG. 1.
Figure 3:
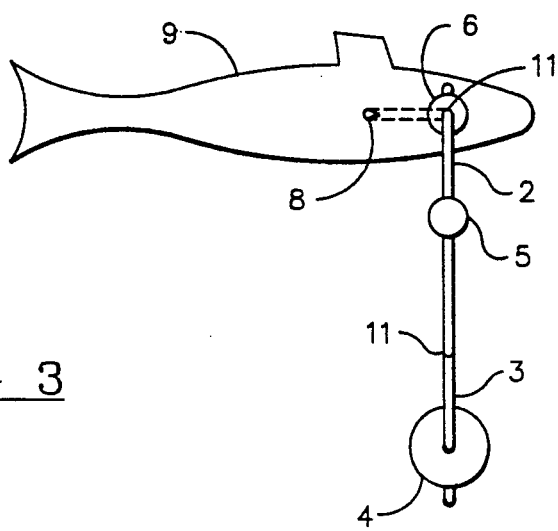
FIG. 3 is a front view of lure attachment device shown in FIG. 1.

The line attachment 7 may be located at any position on the lure bearing arm 1 FIG. 1. The lure bearing arm 1 may be straight as indicated in 1 FIG. 1 or bent as indicated in 1 FIG. 4. The hook(s) 8 is/are attached to the end of lure bearing member 1 FIG. 1 and are preferably rigidly affixed to the lure bearing member 1 in order that the lure may be locked into a horizontal plane at approximately right angles to the lure bearing member in order that a circular swimming motion is obtained. If only increased action is desired the hook(s) need not be rigidly affixed to the lure bearing member 1. Where circular swimming action is desired the lure should be locked into a horizontal plane as indicated in 9 FIG. 1, and 9 FIG. 3 and at approximately right angles to the lure bearing member 1 as indicated in 9 FIG. 1, FIG. 2 and FIG. 3.

The foregoing disclosure and description of the invention is illustrative and explanatory thereof and various changes in size, shape, and materials, as well as details of the illustrated construction may be made within the scope of the invention, without departing from the spirit of the invention.

I claim:

1. A multi-weighted spring driven lure attachment device consisting of a resilient member bent into three sections and weights mounted thereon, said resilient member including a first section having a lure and hook bearing arm member with lure attachment means; a second section bent substantially perpendicular to said first section; a third section bent from said second section; wherein a first weight is attached to said third section and a second weight is attached to the first section or the second section, and the first weight is as heavy or heavier than the second weight.

2. The lure attachment device of claim 1 wherein the first weight is heavier than the second weight.

3. The lure attachment device of claim 1 wherein the first weight is as heavy as the second weight.

4. The lure attachment device of claim 1 wherein the second weight is attached to the first section.

5. The lure attachment device of claim 1 wherein the second weight is attached to the second section.

6. The lure attachment device of claim 1 wherein the first weight is adjustable along the third section.

7. The lure attachment device of claim 1 wherein said second section is coiled.

* * * * *